United States Patent
Andersen et al.

(10) Patent No.: US 6,513,992 B2
(45) Date of Patent: Feb. 4, 2003

(54) PLANAR FIBER OPTICAL HOUSING

(75) Inventors: Bo A. Andersen, Bridgewater, NJ (US); Stephen K. Fairchild, Mertztown, PA (US); Jay Liu, North Andover, MA (US); Kirk J. Witherow, Perkasie, PA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/726,097

(22) Filed: Nov. 29, 2000

(65) Prior Publication Data

US 2002/0064352 A1 May 30, 2002

(51) Int. Cl.⁷ .................................. G02B 6/36
(52) U.S. Cl. .............................. 385/92; 385/93; 385/39
(58) Field of Search ..................... 385/52–75

(56) References Cited

U.S. PATENT DOCUMENTS

| | | | |
|---|---|---|---|
| 4,842,391 A | * 6/1989 | Kim et al. ..................... | 385/92 |
| 4,984,864 A | 1/1991 | Blyer, Jr. et al. ............. | 385/46 |
| 5,247,598 A | 9/1993 | Takimoto et al. ............. | 385/99 |
| 5,408,553 A | 4/1995 | English, Jr. et al. .......... | 385/36 |
| 5,661,835 A | * 8/1997 | Kato et al. ..................... | 385/92 |
| 5,732,175 A | 3/1998 | Fan | |
| 5,832,150 A | 11/1998 | Flint ............................. | 385/31 |
| 5,877,876 A | * 3/1999 | Birdwell .................... | 385/17 X |
| 6,061,493 A | 5/2000 | Gilliland et al. | |
| 6,236,787 B1 | * 5/2001 | Laughlin ..................... | 385/52 |
| 6,253,010 B1 | 6/2001 | Belser et al. ................. | 385/52 |

OTHER PUBLICATIONS

"Bellcore Testing," www.elliottlabs.com. © 2000 Elliott Laboratories (2pp).

* cited by examiner

*Primary Examiner*—Brian Sircus
*Assistant Examiner*—Son V. Nguyen

(57) ABSTRACT

An assembly for housing optical components includes sides formed of an optically transmissive material, such as anti-reflective glass. Optical energy interacts with optical components retained within the assembly via the optically transmissive material. Collimated lens assemblies, which are attached to optical fibers, are adhesively attached to the optically transmissive sides. This assembly is especially amenable to an automated assembly process because it allows easy alignment of the collimated lens assembly with optical components retained within the assembly, and adherence of the collimated lens assembly to the optically transmissive side thereafter.

5 Claims, 5 Drawing Sheets

PLANAR FIBER OPTICAL HOUSING

FIELD OF THE INVENTION

The present invention relates to the field of fiber optics, and specifically to housings for optical components.

BACKGROUND

The increase in voice and data communications in recent years has contributed to a need to transmit and receive data at increasingly higher rates. Optical fiber communications systems are used to help meet this need. Advantages of optical fiber systems over, for example, electrical systems include increased bandwidth and smaller size. Packaging of fiber optic systems is an important factor to consider when attempting to achieve these smaller size systems.

Packaging optical components in a planar geometry (flat), rather than in a cylindrical geometry, is preferred to efficiently utilize space. FIG. 1 is a top view of a prior art planar package. Optical components such as isolators, taps, wavelength division multiplexers (WDMs), and lenses, are typically housed in area 2 (components not shown). Optical fiber pairs 4 and 6 are attached to collimated lens assemblies 10 and 12, respectively. Multiple collimated lens assemblies may also be attached to each of the two sides to which collimated lens assemblies 10 and 12 are attached (multiple collimated lens assemblies not shown in FIG. 1). Energy is optically coupled to components within area 2 through openings 14 in the housing 8.

Typically, collimated lens assemblies 10 and 12 are either laser welded or soldered to the housing 8. Laser welding often results in positional shifts of optical components after attachment. This shifting of components is referred to as post-weld shift. Post-weld shift often results in a misalignment of components. Misalignment can result in degraded processing performance, increased insertion loss, and, at times, discarding the assembly. Laser welding requires access, by the laser welder, to the surfaces to be welded. The spacing required between lens assemblies can inhibit the welding process. Spacing the lens assemblies far enough apart such that access is available to a laser welder limits the number of lens assemblies per side. Laser welding also requires high amounts of energy to perform the welding process.

Soldering requires sustained heat for relatively long periods of time in order to flow the solder. This heat often detrimentally affects other components. Another disadvantage associated with soldering is positional shifts of optical components caused by cooling shrinkage. This positional shift of components can cause the same detrimental effects as post-weld shift (e.g., component misalignment, increased insertion loss, and decreased processing performance). Thus, a need exists for a planar packaging apparatus and method which does not inherently suffer the above disadvantages.

SUMMARY OF THE INVENTION

A planar fiber optic housing comprises a region for retaining optical components in a planar configuration. At least one side of the region comprises an optically transmissive material for coupling optical components thereto.

It is to be understood that both the foregoing general description and the following detailed description are exemplary, but are not restrictive, of the invention.

BRIEF DESCRIPTION OF THE DRAWINGS

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures.

DETAILED DESCRIPTION

An exemplary embodiment of the present invention comprises an optical component planar housing having two opposing, optically transmissive sides. Energy is optically coupled between optical fibers and the optical components through anti-reflective (AR) glass windows, which form the opposing sides of the planar housing. The optical fibers are attached to collimated lens assemblies and the collimated lens assemblies are adhesively attached to the windows. Adhesively attaching the collimated lens assemblies to the windows facilitates an automated assembly process and eliminates problems associated with welding collimated lens assemblies to non-transparent housing sides.

Figure 1:
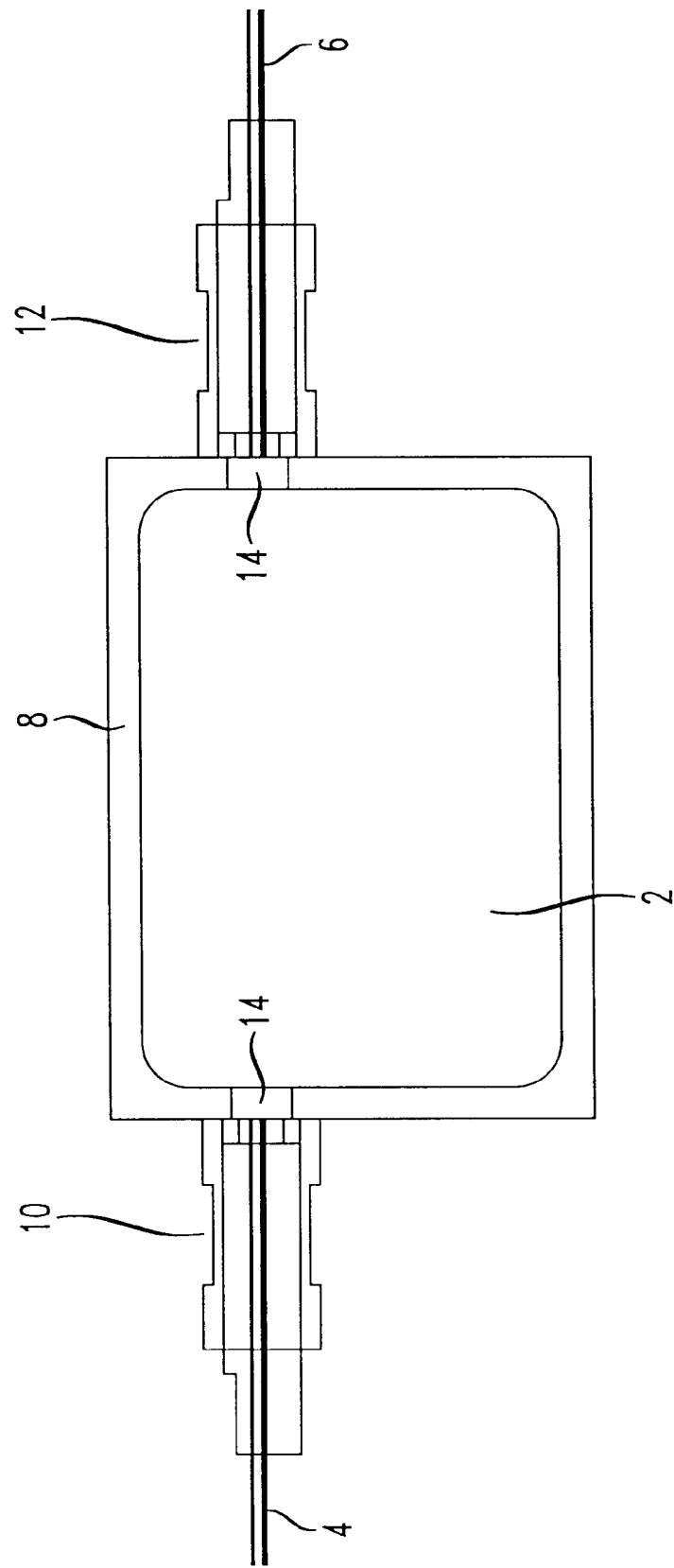
FIG. 1 is a top view of a prior art planar package.
Figure 2:
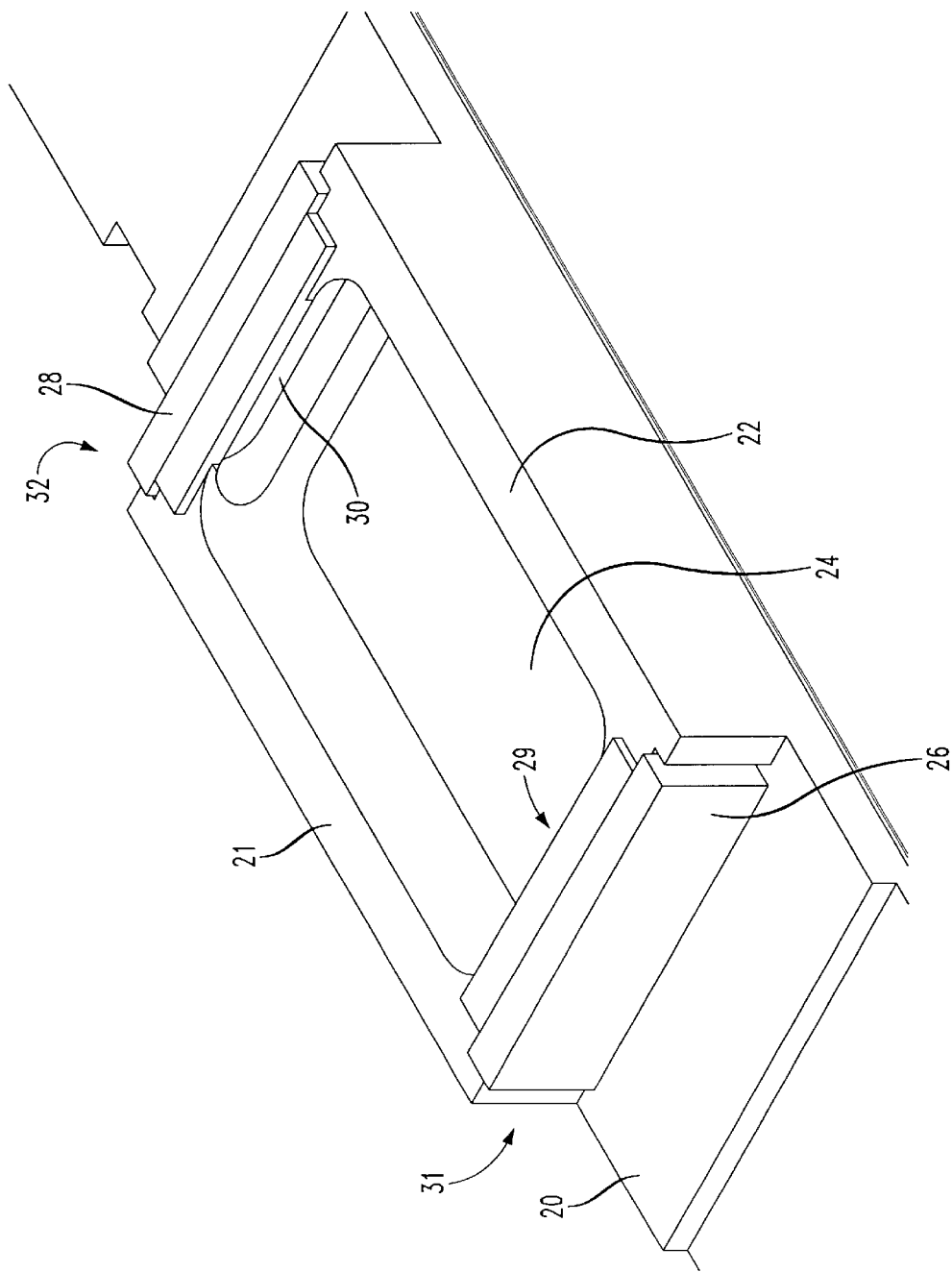
FIG. 2 is an isometric view of an exemplary embodiment of a structure for retaining optical components in a planar configuration having optically transmissive sides in accordance with the present invention.

Referring now to the drawings, wherein like reference numbers refer to like elements throughout, FIG. 2 is an isometric view of an exemplary embodiment of a structure for retaining optical components in a planar configuration having optically transmissive sides in accordance with the present invention. In FIG. 2, base structure 20 forms the bottom of region 24. Region 24 may retain optical components such as wavelength division multiplexers (WDMs), lenses, prisms, taps, reflectors, and isolators (components not shown in FIG. 2). As depicted in FIG. 2, members 21 and 22 are integral with base structure 20, and form opposing sides of region 24. It is envisioned, however, that members 21 and 22 may be separate from base structure 20, but rigidly attached by any appropriate means such as adhesively, snap fit, press fit, or bolted. Base structure 20 and/or members 21 and 22 may comprise any appropriate material, such as stainless steel.

Opposing sides 31 and 32 comprise openings 29 (not shown in FIG. 2) and 30, respectively. Openings 29 and 30 each allow optical energy to enter and exit region 24. Windows 26 and 28 are attached to sides 31 and 32, respectively. Windows 26 and 28 comprise an optical transmissive material, such as glass or anti-reflective glass. Windows 26 and 28 may be attached to sides 31 and 32, respectively, by any means, such as press fit coupling, snap fitting, welding, soldering, and/or adhesively.

Figure 3:
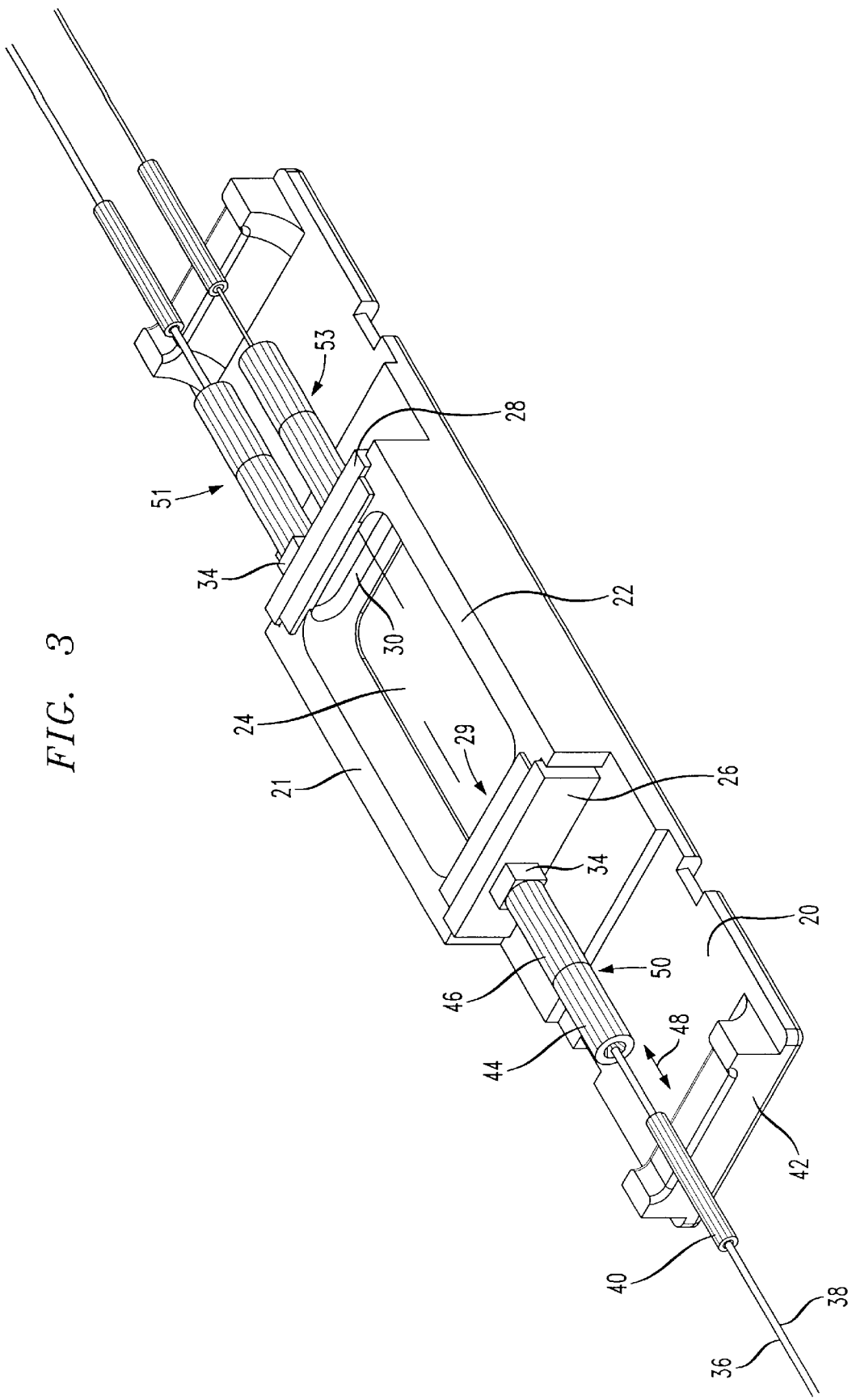
FIG. 3 is an isometric view of an optical component assembly in accordance with the present invention optically coupled to optical fibers.

FIG. 3 is an isometric view of an optical component assembly in accordance with the present invention optically coupled to optical fibers. Optical fibers 36 and 38 are attached to collimated lens assembly 50. Collimated lens assemblies are used to optically couple energy between optical fibers and optical components. As shown in FIG. 3, collimated lens assemblies 50, 51, and 53 optically couple energy between optical fibers and components positioned in region 24 (components not shown in FIG. 3), through windows 26 and 28.

Collimated lens assemblies may comprise combinations of several components, such as lenses, filters, ferrules, and wavelength division multiplexers (WDMs). Exemplary collimated lens assembly 50 comprises a ferrule 44, a lens 46, and an optical filter 34. Ferrule 44 is a cylindrical device having apertures sized to fit optical fibers 36 and 38. Optical fibers 36 and 38 are mounted in ferrule 44. Ferrule 44 centers and aligns optical fibers 36 and 38. Optical fibers 36 and 38 are terminated within ferrule 44. Typically, cylindrical ferrules are limited to housing no more than two optical fibers because of the strict tolerances associated with transferring optical energy between a pair of optical fibers. Lens 46 focuses optical energy.

Lens 46 may comprise any suitable lens, such as a gradient radial index (hereinafter GRIN) lens, a molded aspheric lens, or a ground spherical lens. In the exemplary embodiment shown in FIG. 3, lens 46 is a GRIN lens. Note that collimated lens assemblies 50 and 51 each comprise filter 34 attached to the lens of the collimated lens assembly. Filter 34 is optional. Note that collimated lens assembly 53 does not comprise a filter. Depending upon system requirements, other optical components (e.g., WDM) may be positioned between the lens of the collimated lens assembly and the window.

Collimated lens assembly 50 is attached to window 26 and collimated lens assemblies 51 and 53 are attached to window 28. The attachment of collimated lens assembly 50 to window 26 and collimated lens assemblies 51 and 53 to window 28, may be by any appropriate means, such as through the use of an adhesive (e.g., optical quality heat cured epoxy MH77A). Adhesively attaching the collimated lens assemblies to the windows does not require sustained localized heating, in contrast to soldering and laser welding. Therefore components are not as susceptible to heat damage. Also, because adhesively attaching the collimated lens assemblies to the window does not require access by a laser welder, more collimated lens assemblies can be adhered to the window. Furthermore, windows 26 and 28 may be adjusted in size to accommodate any number of collimated lens assemblies and therefore, more optical fibers. Additionally, the curing process associated with adhesively attaching the collimated lens assemblies to the windows does not misalign the components to the same degree as does post weld shift.

Thus the alignment procedure associated with adhesively attaching collimated lens assemblies to the windows is less time consuming and more easily accomplished than the alignment process associated with laser welding.

Optical fibers 36 and 38 are axially positioned within bend limiter tubing 40. Bend limiter tubing 40 is a hollow, generally cylindrical sleeve through which optical fibers 36 and 38 are positioned to limit the bending of the optical fibers. In an exemplary embodiment of the invention, optical fibers 36 and 38 are attached to the inner surface of bend limiter tubing 40 with a filler material. The filler material may comprise, for example, a commercially available pliable adhesive (e.g., silicone). Attaching optical fibers 36 and 38 to the inner surface of bend limiter tubing 40 facilitates the automated assembly process by reducing the motion of optical fibers 36 and 38. The filler material reduces axial motion of optical fibers 36 and 38 in the directions indicated by arrow 48. Axial motion may be caused by mechanical strain applied to optical fibers 36 and 38 during the assembly process. Axial motion may also be caused by expansion and contraction of optical fibers 36 and 38, and/or other components, due to thermal variation. Excessive axial motion may cause optical fibers 36 and 38 to bend and ultimately sustain damage. The filler material also reduces radial motion of optical fibers 36 and 38, thus reducing the possibility of any damage due to radial motion.

Support member 42 provides support for bend limiter tubing 40 and optical fibers 36 and 38. In an exemplary embodiment of the invention, optical fibers 36 and 38 are rigidly attached to collimated lens assembly 50. This rigid attachment also contributes to the bending of optical fibers 36 and 38 when subjected to axial motion. The support provided by support member 42 reduces bending of optical fibers 36 and 38, and reduces the possibility of optical fibers 36 and 38 becoming detached from collimated lens assembly 50. In an exemplary embodiment of the invention, bend limiter tubing 40 is attached to support member 42. Attachment of bend limiter tubing 40 to support member 42 may be achieved through the use of, for example, an adhesive such as epoxy. Attachment of bend limiter tubing 40 to support member 42 facilitates the automated assembly process by reducing movement of bend limiter tubing 40, which in turn reduces movement of optical fibers 36 and 38.

It is emphasized that the embodiment of the invention shown in FIG. 3 is exemplary. FIG. 3 shows two optical fibers, 36 and 38. FIG. 3 shows support member 42 as an integral part of base structure 20. It is envisioned that base structure 20 and support member 42 may be separate, but rigidly attached by any appropriate means such as adhesively, snap fit, press fit, or bolted.

Figure 4:
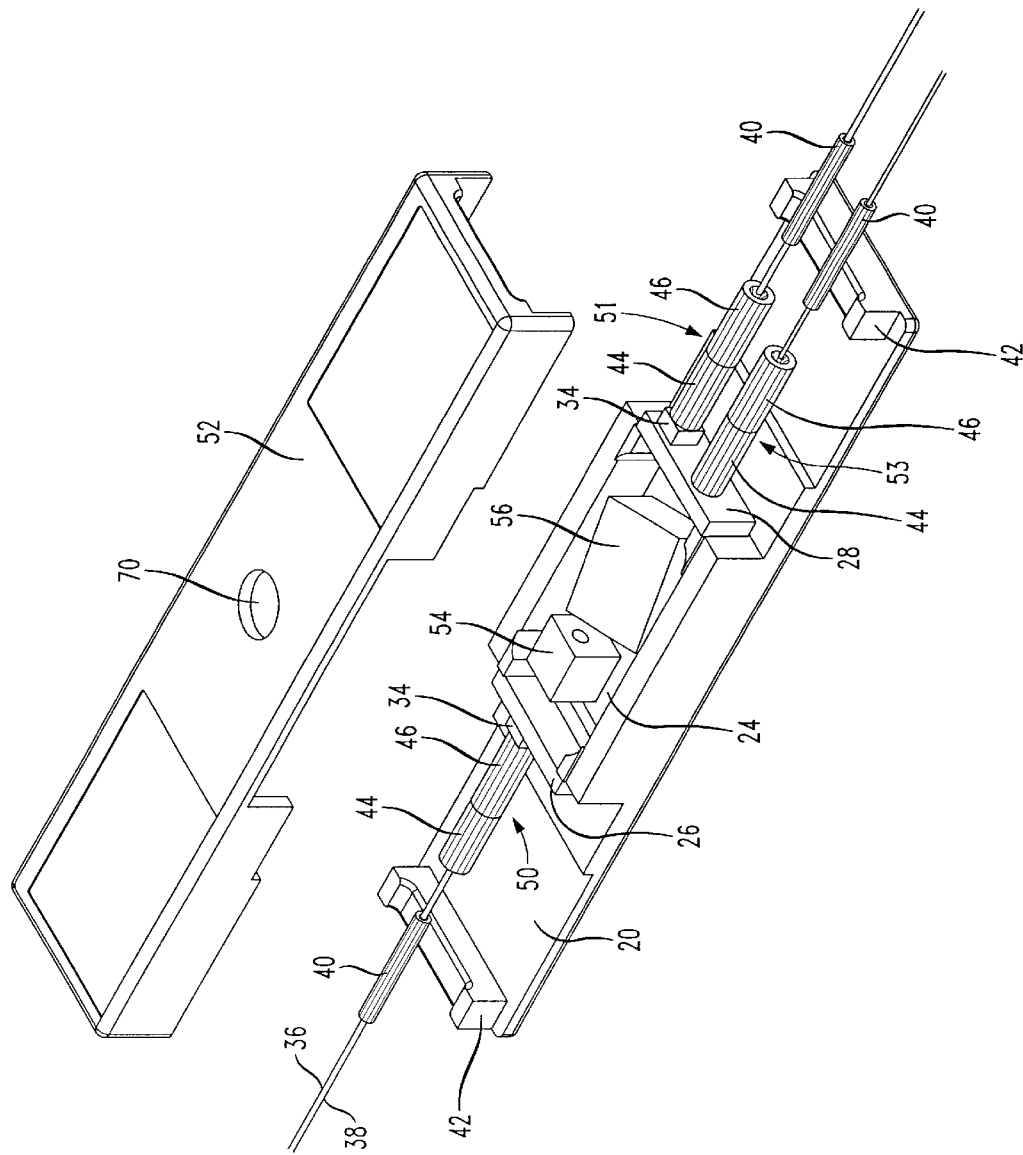
FIG. 4 is an exploded view of an optical component assembly, in a planar configuration, in accordance with the present invention.

FIG. 4 is an exploded view of an optical component assembly, in a planar configuration, in accordance with the present invention. Region 24 within the housing, may retain any combination of optical components. Optical components 54 and 56 represent exemplary optical components which may be retained in region 24, examples of which include lenses, reflectors, isolators, taps, and WDMs. In the exemplary embodiment of the invention shown in FIG. 4, optical component 54 is an isolator and optical component 56 is a prism. In this embodiment, isolator 54 ensures that optical energy is directed toward optical component 56 with minimal reflection of optical energy back toward collimated lens assembly 50. Optical energy which has interacted with isolator 54 is directed toward prism 56. Prism 56, apportions and routes the optical energy received from isolator 54 to collimated lens assemblies 51 and 53.

Isolator 54 and prism 56 form a free air space optical network. Optical energy is coupled between window 26 and isolator 54, between isolator 54 and prism 56, and between prism 56 and window 28, through air. A free air space optical network may not be appropriate in an environment with high ambient optical energy. In high ambient optical energy environments, it is advantageous to provide a cover, such as upper portion 52 over region 24. Upper portion 52 also protects optical components within region 24 from damage (e.g., dust, collision, contamination) during storage, shipping, and use. Opening 70, in upper portion 52 may remain open or be filled with material. An example of a filler material for hole 70 is a membrane comprising a wicking agent to withdraw moisture from region 24.

Upper portion 52 is positioned opposite base structure 20 and support members 42. Upper portion 52 is attached to base structure 20 and/or support member 42. Attachment of upper portion 52 to base structure 20 and/or support member 42 may be accomplished by any means known in the art (e.g., adhesives, press fit, bolted, or snaps). Bend limiting tubing 40 is positioned between support member 42 and upper portion 52. Positioning and attaching bend limiting tubing 40 between support member 42 and upper portion 52 facilitates the automated assembly process by limiting movement of bend limiting tubing 40 and optical fibers 36 and 38.

Bend limiter tubing 40 is positioned around each group of optical fibers coupled to the optical component housing. Placing bend limiter tubing around all optical fibers facilitates the automated assembly process by reducing fiber motion. Support members 42 provide support for all bend limiter tubes 40. Supporting all bend limiter tubes 40 with support member 42 facilitates the automated assembly process by reducing motion of the optical fibers and bend limiter tubing. In various embodiments of the invention, bend limiting tubing 40 is attached to support member 42 and/or upper portion 52. Attachment of bend limiter tubing 40 to support member 42 and/or upper portion 52 may be achieved through the use of, for example, an adhesive such as epoxy, or a press fit. Attachment of bend limiter tubing 40 to support member 42 and/or upper portion 52 facilitates the automated assembly process by reducing movement of bend limiter tubing 40, which in turn reduces movement of optical fibers 36 and 38.

Figure 5:
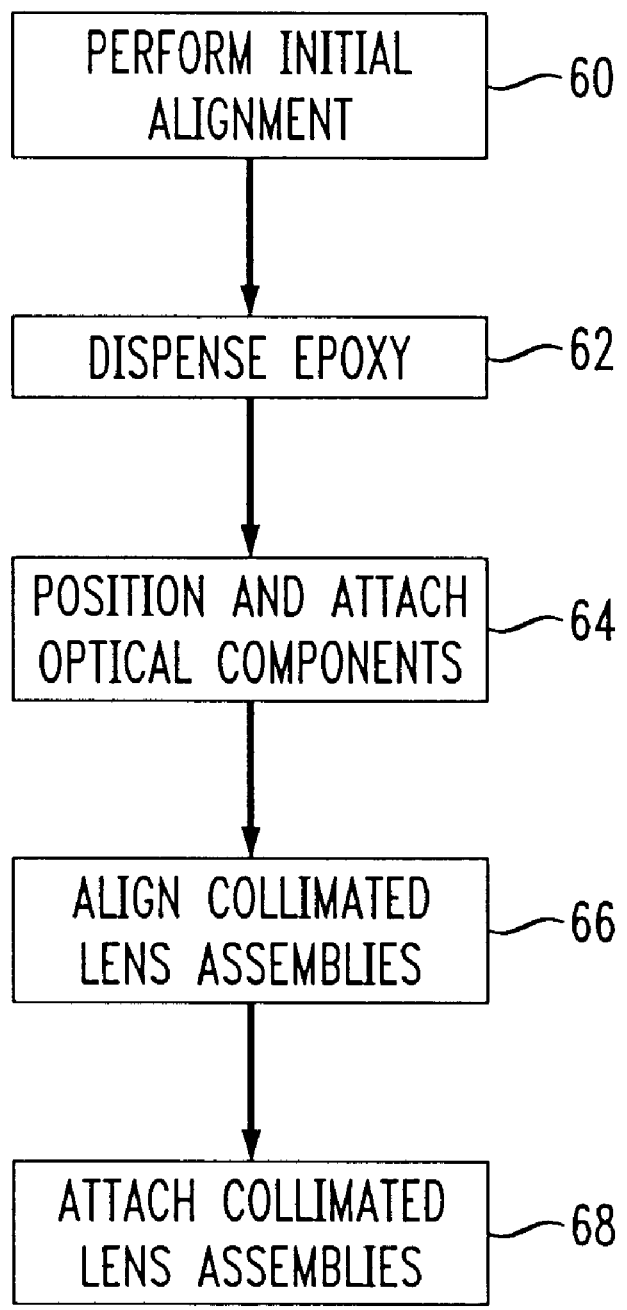
FIG. 5 is a flow diagram of an exemplary fabrication process of a planar optical component assembly in accordance with the present invention.

As described below, an optical component assembly in accordance with the present invention, and as depicted in FIG. 4 facilitates an automated assembly process by allowing the placement of optical components, such as exemplary optical components 54 and 56, in region 24, separate from the alignment, and coupling of collimated lens assemblies to windows 26 and 28. FIG. 5 is a flow diagram of an exemplary fabrication process of a planar optical component assembly in accordance with the present invention. The description of the process depicted in FIG. 5 refers to elements in FIG. 4.

Initially, in step 60, alignment of collimated lens assemblies 50, 51, and 53 with optical components 54 and 56 is performed to determine nominal placement coordinates to be used in the automated assembly process. Base structure 20, support structures 42, and windows 26 and 28 are provided preassembled (hereinafter "the housing assembly"). The nominal placement coordinates determine the location of optical components 54 and 56, and collimated lens assemblies 50, 51, and 53 on the housing assembly. Initial alignment is performed by positioning collimated lens assembly 50, on window 26. Optical components 54 and 56 are positioned in their approximate locations within the housing assembly. Photodetectors (photodetectors not shown in FIG. 4) are positioned on window 28 at the approximate expected locations of collimated lens assemblies 51 and 53. A photodetector is an optoelectric device for receiving optical energy and providing an electrical signal. The voltage or current of the electrical signal is proportionate to the intensity of the received optical energy. Optical energy is provided through collimated lens assembly 50 and optical components 54 and 56, to the photodetectors. The positions of optical components 54 and 56, collimated lens assembly 50, and the photodetectors are adjusted until the voltage or current of the electrical signals provided by the photodetectors is maximized; thus indicating proper optical alignment. Nominal placement coordinates are determined from these positions, and are programmed into an automated assembly placement mechanism.

Once the initial alignment is complete and nominal placement coordinates have been established, the automated assembly process begins. First, the housing assembly is placed on a conveyor belt. In step 62, the housing assembly is then moved to an epoxy station where a pattern of epoxy is deposited in region 24 of the housing assembly. The pattern of epoxy corresponds to the placement coordinates and shapes of optical components 54 and 56.

In step 64, optical components 54 and 56 are positioned and attached to the housing assembly in accordance with the placement coordinates. The housing assembly is clamped by a clamping mechanism having a heater. The heater starts the curing process as the optical components are placed within the housing assembly and adhesively attached to the housing assembly by the pattern of epoxy. Optical components 54 and 56 are placed in the housing assembly by an automated placement mechanism, which places the optical components in the proper position and location within a small tolerance.

In step 66, collimated lens assemblies 50, 51 and 53 are aligned with optical components 54 and 56. Collimated lens assemblies, optical fibers, and bend limiters are provided preassembled. Each optical fiber is provided with a connector at the end opposite the collimated assembly. This connector allows for providing, receiving, and measuring optical signals. Alignment in step 66 is performed to compensate for the tolerances associated with the placement of optical components 54 and 56. First, the collimated lens assemblies are positioned in accordance with the nominal placement coordinates. Optical energy is provided via the connector on the fibers attached to collimated lens assembly 50. The optical energy received via the connectors on the fibers attached to collimated lens assemblies 51 and 52 is monitored while collimated lens assemblies 50, 51, and 53 are positioned to ensure maximum throughput of optical energy. In step 68, collimated lens assemblies 50, 51 and 53 are adhesively attached to the housing assembly in accordance with the most recent alignment positions.

Many of the automated assembly steps herein described are performed concurrently. Thus, the process depicted in FIG. 5 facilitates an automated assembly process of a plurality of packages by allowing separate and concurrent (1) assembly of the housing assemblies, (2) assembly of collimated lens assemblies and optical fibers, and (3) alignment, positioning, and attachment of optical components and collimated lens assemblies.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

What is claimed is:

1. A planar fiber optic assembly comprising:
   a region for retaining optical components in a planar configuration;
   a base forming a bottom of said region;
   opposing first and second sides of said region, wherein said first side and said second side comprise an optically transmissive material;
   a first set of fibers comprising at least one optical fiber, said first set of fibers attached to a first lens assembly, wherein said first lens assembly is adhesively attached to said first side;
   a second set of fibers comprising at least one optical fiber, said second set of fibers attached to a second lens assembly, wherein said second lens assembly is adhesively attached to said second side; and
   at least one support member attached to said base for supporting at least one of said first set of fibers and said second set of fibers.

2. A method for fabricating a planar optical package having a region for retaining optical components optically coupled to optical fibers, said method comprising the steps of:

providing an assembly comprising said region, wherein opposing first and second sides of said region comprise an optically transmissive material;

positioning at least one optical fiber on said first side of said region;

positioning at least one optoelectric device on said second side of said region;

positioning said optical components within said region;

initially aligning said at least one optical fiber, said optical components, and said at least one optoelectric device to determine respective nominal positions;

attaching said optical components within said region at their respective nominal positions;

positioning said at least one optical fiber on said first side of said region and positioning remaining optical fibers on said second side of said region, in accordance with their respective nominal positions;

aligning said at least one optical fiber with said remaining optical fibers through said optical components; and adhesively attaching said at least one optical fiber to said first side of said region and adhesively attaching said remaining optical fibers to said second side of said region.

3. The method in accordance with claim 2 wherein said base comprises at least one support member for supporting at least one optical component.

4. The method in accordance with claim 2 wherein said optically transmissive material comprises a material selected from the group consisting of glass and anti-reflective glass.

5. The method in accordance with claim 2 wherein said base comprises stainless steel.

* * * * *

UNITED STATES PATENT AND TRADEMARK OFFICE
CERTIFICATE OF CORRECTION

PATENT NO. : 6,513,992 B2
DATED : February 4, 2003
INVENTOR(S) : Bo A. Anderson et al.

It is certified that error appears in the above-identified patent and that said Letters Patent is hereby corrected as shown below:

<u>Title page</u>,
Item [73], Assignee, delete "Lucent Technologies, Inc., Murray Hill, NJ," and insert therefor -- Agere Systems Inc., Allentown, PA --.

Signed and Sealed this

Tenth Day of August, 2004

JON W. DUDAS
*Acting Director of the United States Patent and Trademark Office*